United States Patent [19]

Potter

[11] Patent Number: 5,466,980

[45] Date of Patent: Nov. 14, 1995

[54] CHARGED ROTOR POLE MICROMACHINE MOTOR

[75] Inventor: Michael D. Potter, Grand Isle, Vt.

[73] Assignee: International Business Machines Corporation, Armonk, N.Y.

[21] Appl. No.: 346,063

[22] Filed: Nov. 29, 1994

[51] Int. Cl.⁶ .................................................. H02N 1/00
[52] U.S. Cl. .................................................. 310/309
[58] Field of Search .......................... 310/40 MM, 308, 310/309; 313/309

[56] References Cited

U.S. PATENT DOCUMENTS

| | | | |
|---|---|---|---|
| 4,740,410 | 4/1988 | Muller et al. | 428/133 |
| 4,789,803 | 12/1988 | Jacobsen et al. | 310/309 |
| 4,943,750 | 7/1990 | Howe et al. | 310/309 |
| 5,001,381 | 3/1991 | Watanabe | 310/309 |
| 5,013,954 | 5/1991 | Shibaike et al. | 310/309 |
| 5,015,906 | 5/1991 | Cho et al. | 310/309 |
| 5,043,043 | 8/1991 | Howe et al. | 156/645 |
| 5,187,399 | 2/1993 | Carr et al. | 310/40 |
| 5,189,323 | 2/1993 | Carr et al. | 310/40 |
| 5,233,263 | 8/1993 | Cronin et al. | 313/309 |
| 5,252,881 | 10/1993 | Muller et al. | 310/309 |
| 5,262,695 | 11/1993 | Kuwano et al. | 310/309 |

FOREIGN PATENT DOCUMENTS

WO91/11848 of 1991 WIPO.
WO91/11849 of 1991 WIPO.

*Primary Examiner*—Clayton E. LaBalle
*Attorney, Agent, or Firm*—Heslin & Rothenberg

[57] ABSTRACT

An electrostatic micromachine motor includes a rotor having a hub and one or more rotor poles extending radially outward from the center of the hub. Near an exposed end of each rotor pole, an electron trap region is formed between a first layer and a second layer, with the first layer being the exposed end of the pole. The first layer and the second layer are formed of dissimilar insulators. An emitter device may be positioned adjacent to the exposed end of each rotor pole for injecting electrons into the electron trap region. Preferably, the emitter device is positioned adjacent to the exposed end, such that the emitter has a tip pointing towards, and spaced at a distance less than a mean free path distance of an electron in air, away from the first layer. A plurality of stator poles may be aligned about a periphery of the rotor. Both positive and negative voltages may be applied to the plurality of stator poles for causing rotation of the rotor of the micromotor.

20 Claims, 1 Drawing Sheet

CHARGED ROTOR POLE MICROMACHINE MOTOR

BACKGROUND OF THE INVENTION

Technical Field

The present invention generally relates to micromachines. More particularly, the present invention relates to electrostatic micromachine motors.

Background Information

Utilizing the same manufacturing techniques and materials used in microchip and semiconductor technology, microscopic movable parts such as motors, cranks, gears, and springs have been successfully constructed.

Conventional electrically driven micromotors are driven by electrostatic forces between motor elements, and not the magnetic fields used in most motors. To drive the conventional micromotor, negative and positive voltages are applied to stator poles so as to generate an electric field across a gap between the stator poles and adjacently aligned rotor poles. The positive and negative stator voltages induce opposing charges on the rotor poles adjacent the stator poles. Through sequential charging, i.e., step-wise biasing, of the rotor and stator elements of the micromotor, rapid rotation of the rotor is caused.

While micromachine motors have been successfully fabricated and tested, they have not proved entirely satisfactory under all operating conditions. For instance, considerable difficulty has been experienced in fabricating satisfactory bearings for the moving elements of these micromachine motors. Therefore, friction, or as it is sometimes referred, stiction, has a profound effect on the operation of the components of micromachine motors, all of which have incredibly low masses. More specifically, the problem of friction and wear due to mechanical contact between moving and stationary parts of micromachine motors is a paramount concern because the performance and reliability of these microdevices is directly related to the amount of friction generated during operation. Because frictional forces play a significant role at this microscopic level, high initiating and sustaining voltages are required for the operation of conventional micromotors. Also, because conventional electrostatic micromachine motors induce charge on a conductive rotor to generate rotation, the internal electrical resistance of the rotor negatively affects the maximum speed and power output of the micromotor.

Therefore, one problem associated with conventional micromotors is that high voltages are required to initiate and sustain rotation of the micromotor. By reducing the applied voltages necessary for operation, however, significant advantages over conventional micromotors may be achieved. For instance, the micromotor of the present invention is compatible with very large scale integration (VLSI) technology. More specifically, high operating voltages limit the usefulness of conventional micromotors in low voltage applications such as integrated driver circuits utilizing CMOS or bipolar technology.

Thus, a need exists for a micromachine motor which reduces the initiating and sustaining voltages of micromachine motors. The structure of the present invention contains a solution to the aforementioned problems.

SUMMARY OF THE INVENTION

Briefly, the present invention satisfies this need and overcomes the shortcomings of the prior art through the provision of a charged rotor pole micromachine motor, which includes a rotor having a hub and one or more rotor poles extending radially outward from the a central axis of the hub, and an electron trap region formed near an exposed end of the one or more rotor poles, the electron trap region being formed between a first layer and a second layer, with the first layer being the exposed end of the pole.

Preferably, the first layer and the second layer are formed of insulator materials dissimilar from one another. An emitter device can be positioned adjacent to the exposed ends of the one or more rotor poles for injecting elections into the electron trap region. It is preferred that the emitter device is positioned adjacent to the exposed ends of the one or more rotor poles, such that the emitter has a tip pointing towards, and spaced at a distance less than a mean free path distance of an electron in air, away from the exposed end of the first layer of the rotor pole. Typically, the emitter device is a lateral field emitter.

It is therefore an object of the present invention to provide a charged rotor pole micromachine motor which requires reduced micromotor initiating and sustaining voltages.

It is another object of the present invention to provide a micromachine motor, having a rotor which can be fabricated entirely from insulator materials.

It is yet another object of the present invention to provide a micromachine motor which creates a fixed charge on the exposed ends of the rotor poles.

It is still another object of the present invention to provide a charged rotor pole micromachine motor of the present invention which is compatible with very large scale integration technology.

BRIEF DESCRIPTION OF THE DRAWINGS

The subject matter which is regarded as the present invention is particularly pointed out and distinctly claimed in the concluding portion of the specification. The invention, however, both as to organization and method of practice, together with the further objects and advantages thereof, may be best understood by reference to the following detailed description taken in conjunction with the accompanying drawings in which:

DETAILED DESCRIPTION OF THE PREFERRED EMBODIMENTS

Figure 1:
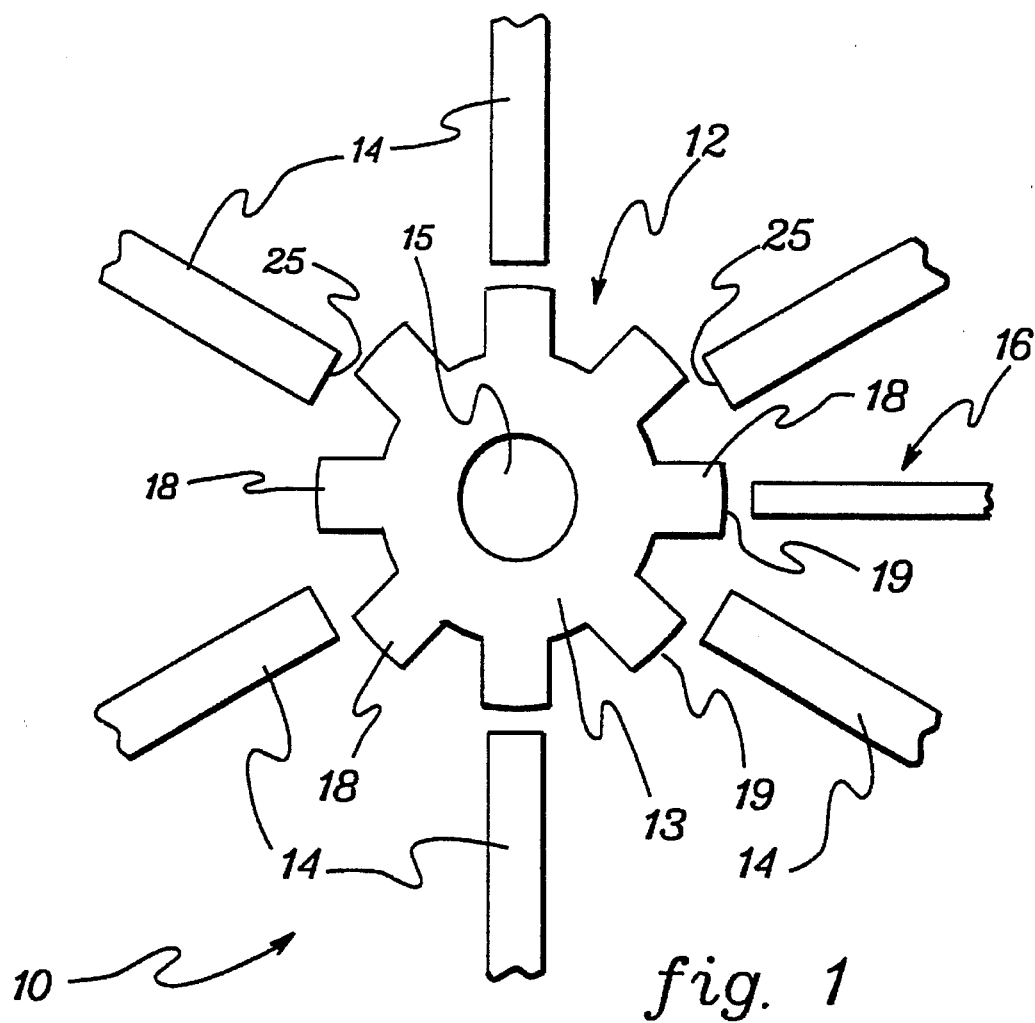
FIG. 1 is a top view of a charged rotor pole micromachine motor of the present invention, including a rotor having a plurality of rotor poles, and a plurality of stator poles and an emitter device located about the periphery of the rotor.
Figure 2:
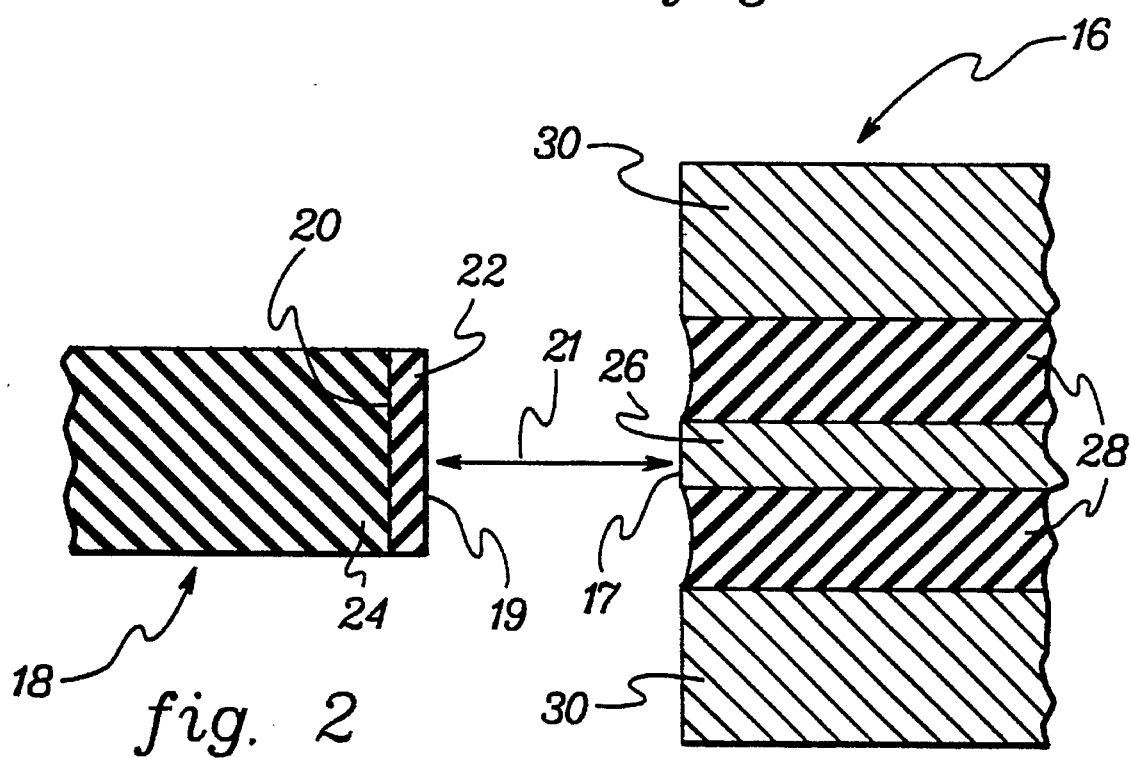
FIG. 2 is a side view of one of the rotor poles in conjunction with the emitter device of the charged rotor pole micromachine motor of FIG. 1.

It will be readily apparent that the components of the present invention, as generally described and illustrated in the figures, could be arranged and designed in a wide variety of different configurations. Thus, the following detailed description of the presently preferred embodiments of the charged rotor pole micromachine of the present invention, as represented in FIGS. 1 and 2, is not intended to limit the scope of the invention, as claimed, but is merely representative of the presently preferred embodiments of the invention. The presently preferred embodiments of the invention will be best understood by reference to the drawings, where like parts are designated with like numerals.

In reference to the drawings, and more particularly to FIGS. 1 and 2, there is shown in accordance with the charged rotor pole micromachine motor of the present invention, one embodiment of a micromotor 10. As shown in FIGS. 1 and 2, micromotor 10 comprises a rotor 12, a plurality of stator poles 14 situated about the periphery of rotor 12, and an emitter device 16 alignable adjacent to rotor 12. Preferably, rotor 12, stator poles 14, and emitter device 16 are all co-planar.

As shown in FIG. 1, rotor 12 resembles a hub 13 having a plurality of rotor poles 18 extending radially outward from a central axis of rotor 12. Each pole 18 has an exposed end 19 at the outermost periphery of rotor 12. While rotor 12 has eight rotor poles 18 extending radially outward from the center of rotor 12, as shown in FIG. 1, it should be understood that the number of poles is not limited to any specific number, but instead depends upon the design of the micromotor. The center of rotor 12 may include an opening 15 so as to permit attachment to a shaft or other micromechanical bearing structure.

Each rotor pole 18 may be formed of any suitable material, so long as the material creates an electron trap region 20 near the exposed end 19 of each rotor pole 18. Preferably, the end of each rotor pole 18 is formed of two dissimilar insulators so that electron trap region 20 is formed at the interface of the two dissimilar insulators. Electron trap region 20 can be formed by depositing two layers of dissimilar materials one on the other, by conventional integrated circuit fabrication techniques, such as chemical vapor deposition (CVD), etc. Typically, the intimate contact between the two dissimilar materials, formed one on the other, creates electron trap region 20. In reference to FIG. 2, for example, trap region 20 near the end of each rotor pole 18 may be formed of a first layer 22, such as silicon dioxide ($SiO_2$), and a second layer 24, such as silicon nitride ($Si_3N_4$). Another suitable insulator interface may include silicon dioxide ($SiO_2$) and aluminum oxide ($Al_2O_3$). Preferably, the dissimilar materials selected create a trap region having a high electron trap density. As will be seen hereinbelow, a high trap density is preferred because the initiating and sustaining voltages for micromotor 10 are a direct function of the number of electrons trapped in region 20. It is well known that a relatively high electron trap density may be achieved by interfacing silicon nitride ($Si_3N_4$) and silicon dioxide ($SiO_2$), where the density can exceed $6 \times 10^{18}$ traps/$cm^3$.

Also, it is preferred that trap region 20 be created near the exposed end 19 of each rotor pole 18. In order to facilitate creation of trap region 20 near the exposed end 19 of rotor pole 18, it is preferred that the thickness of first layer 22 be limited so that first layer 22 be no greater than a few hundred angstroms. Conventional VLSI processing techniques, such as CVD, can be used to create the thickness of first layer 22 to a desired value.

The remainder of the rotor 12, apart from first layer 22 and second layer 24, may be formed of any suitable material. For instance, the remainder of rotor 12, for instance, hub 13, may be formed of a conductor, so long as the ends of each rotor pole 18 are formed of materials suitable for creating electron trap region 20 thereon. Preferably, however, for the sake of simplicity of fabrication and to maximize the effect of the trapped electrons, the entire rotor 12 is formed of insulator materials. Therefore, the entire rotor may be formed of only the two dissimilar insulators as described hereinabove; for example, each rotor 12 could comprise in its entirety silicon dioxide ($SiO_2$) and silicon nitride ($Si_3N_4$).

Stator poles 14, are preferably co-planar with rotor 12, and positioned about the periphery of rotor 12, thereby creating a side-by-side arrangement of stator to rotor. Each stator pole 14 includes a tip 25, which may align with exposed end 19 of each rotor pole 18. While six stator poles 14 are shown in FIG. 1, it is understood that the present invention is not limited to any number of stator poles, but instead, the number of stator poles selected depends upon the design of the micromotor.

In the preferred embodiment, the distance between the tips of directly aligned stator poles 14 and rotor poles 18 is preferably as small as practicable by present semiconductor fabrication techniques. By minimizing the distance between directly aligned stator poles and rotor poles, larger torques and forces may be produced during operation of micromotor 10. However, the distance should be great enough to support sufficient voltages without breakdown. Also, the distance should be great enough so that no contact of the rotor poles 18 and stator poles 14 is made.

By injecting electrons into the exposed ends 19 of each rotor pole 18, electrons become captured in trap region 20 so as to create a fixed net negative charge on each rotor pole 18. Electrons may be injected into trap region 20 by any known means. For example, electrons may be injected into trap region 20 by an emitter device 16, such as the one described in U.S. Pat. No. 5,233,263, entitled LATERAL FIELD EMISSION DEVICES, issued to Cronin, et al., and assigned to the assignee of the present invention, International Business Machines Corporation, which in its entirety is hereby incorporated by reference. Briefly, emitter device 16 may include an electron emitting cathode member 26, and preferably has a tip 17 which can be positioned adjacent to the exposed end 19 of rotor pole 18 such that emitter 16 has its tip 17 pointing towards exposed end 19. As shown in FIG. 1, cathode member 26 of emitter device 16 may be formed between two insulating layers 28. Insulating layers 28 may be formed between two control grids 30. The exposed end 19 of rotor pole 18 acts as an anode during electron transfer.

As is well-known in the art, the injection of electrons into trap region 20 can be controlled so as to fill region 20 to only a specified level. Moreover, the trap density of region 20 can be controlled by known processing techniques. Once trap region 20 reaches its maximum electron capacity additional electrons will be repelled. The injection of electrons into trap region 20 causes the electrons to become trapped for an extended period of time and for long as a period of years.

In addition to forming first layer 22 of rotor 12 of a material which facilitates a high trap density, first layer 22 of rotor 12 is preferably formed of a material which has a high electron mobility, thereby facilitating the rapid trapping of electrons in trap region 20. Silicon dioxide ($SiO_2$) is one well-known material having a high electron mobility, which is about 20 $cm^2$/volt-second.

The gap 21 separating the direct alignment of tip 17 of emitter device 16 and exposed end 19 of rotor pole 18 is preferably kept to no more than the mean free path of an electron in air. By keeping gap 21 to be less than the mean free path of an electron in air, the distance separating emitter device 16 and rotor pole 18 becomes a virtual vacuum because there is a reduced likelihood of an electron encountering an air molecule as it passes from emitter to anode, i.e., to rotor pole 18. Therefore, the present invention may utilize an emitter device, in which an evacuated environment is unnecessary.

The charged rotor pole micromotor 10 of the present invention reduces the required initiating and sustaining voltages of micromotor 10 over conventional induced charge micromotors. By utilizing the equation set forth below, the effective voltage necessary for operating micromotor 10 can be determined:

$$Q=CV,$$

where Q is total charge, and C is capacitance, and V is voltage, and from, $$C=\epsilon\epsilon_o A/d,$$

where $\epsilon$ is the permittivity constant of air, $\epsilon_o$ is the free space permittivity constant of vacuum, A is the area in which the end of the rotor pole and associated stator pole overlaps, and d is the distance between the end of the rotor pole and the stator pole at direct alignment, and from, $$Q=qN,$$

where Q is total charge, q is the charge on an individual electron, and N is the total number of electrons trapped in region 20, the effective voltage may be determined from, $$V=dNq/\epsilon\epsilon_o A.$$

It can be seen from this relationship that the effective voltage is a direct function of the number of electrons trapped in region 20. In accordance with the present invention, the electric field between a directly aligned stator pole 14 and rotor pole 18 can be significantly increased over conventional induced image charged micromotors. Therefore, the initiating and sustaining voltages can effectively be substantially reduced over conventional micromotors. For example, for a conventional micromotor which requires an effective voltage of 200 volts for operation, the present invention may require only 100 volts.

Operationally, the rotor 12 may be electrostatically rotated and positioned so that each rotor pole 18 can be charged by electron injection via emitter device 16. The rotor may be moved in an indexing fashion so that each rotor pole 18 is charged by electron injection. Once each rotor pole 18 has its trap region 20 filled with electrons, each rotor pole has a net negative charge. Thereafter, as is the case with conventional micromotors, one or more of the stator poles 14 can be positively or negatively biased in a step-like fashion to cause rotation of rotor 12. Applying a negative bias to stator pole 14 will cause the stator pole to repel its directly aligned rotor pole 18, while the placement of a positive bias on stator pole 14 will cause the stator pole 14 to attract the directly aligned rotor pole 18. By properly sequencing the bias on the plurality of stator poles 14, the rotor 12 can be pushed and pulled, causing rotation thereof.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

What is claimed:

1. An electrostatic micromachine motor, comprising:
   a rotor having a hub and one or more rotor poles extending radially outward from a central axis of said hub; and
   an electron trap region formed near an exposed end of said one or more rotor poles, said electron trap region being formed between a first layer and a second layer, with said first layer being the exposed end of said pole.

2. The electrostatic micromachine motor of claim 1, further comprising one or more stator poles aligned about a periphery of said rotor.

3. The electrostatic micromachine motor of claim 1, wherein said first layer is formed of an insulator and said second layer is formed of an insulator dissimilar from said first layer.

4. The electrostatic micromachine motor of claim 3, wherein said first layer is formed of silicon dioxide ($SiO_2$) and said second layer is formed of silicon nitride ($Si_3N_4$).

5. The electrostatic micromachine motor of claim 3, wherein said first layer is formed of silicon dioxide ($SiO_2$) and said second layer is formed of aluminum oxide ($Al_2O_3$).

6. The electrostatic micromachine motor of claim 3, wherein said electron trap region is capable of storing electrons at a density of at least $6 \times 10^{18}$ traps/cm$^3$.

7. The electrostatic micromachine motor of claim 3, wherein said electron trap region is capable of storing electrons at a density of at least $10^{12}$ traps/cm$^2$.

8. The electrostatic micromachine motor of claim 1, wherein an emitter device is positioned adjacent to said exposed end for injecting electrons into said electron trap region.

9. The electrostatic micromachine of claim 8, wherein said emitter device is positioned adjacent to said exposed end, such that said emitter has a tip pointing towards, and spaced at a distance less than a mean free path distance of an electron in air, away from the exposed end of said first layer.

10. The electrostatic micromachine motor of claim 9, wherein said emitter device is a lateral emitter device, said lateral emitter device being oriented substantially parallel to a main length of said one or more rotor poles.

11. An electrostatic micromachine motor, comprising:
    a rotor having a hub and a rotor pole extending radially outward from said hub, said rotor pole having an exposed end thereon;
    an electron trap region formed on said rotor pole near said exposed end between a first layer and a second layer of said rotor pole; and
    an emitter device alignable adjacent to said exposed end of said pole for providing charge to said trap region.

12. The electrostatic micromachine motor of claim 11, wherein said rotor comprises an insulating material.

13. The electrostatic micromachine motor of claim 12, wherein said rotor comprises two dissimilar insulating materials, an interface being formed between said two materials.

14. The electrostatic micromachine motor of claim 13, wherein said interface forms said electronic trap region.

15. The electrostatic micromachine motor of claim 14 wherein said hub further comprises a plurality of rotor poles extending radially outward from said hub.

16. The electrostatic micromachine motor of claim 15 further comprising a plurality of stator poles aligned about a periphery of said rotor.

17. The electrostatic micromachine motor of claim 14, wherein said dissimilar insulating materials comprise silicon dioxide and silicon nitride.

18. The electrostatic micromachine motor of claim 14, wherein said dissimilar insulating materials comprise silicon dioxide and aluminum oxide.

19. The electrostatic micromachine of claim 11, wherein said emitter device is positioned adjacent to said exposed end, such that said emitter has a tip pointing towards, and spaced at a distance less than a mean free path distance of an electron in air, away from said first layer.

20. The electrostatic micromachine motor of claim 19, wherein said emitter device is a lateral emitter device, said lateral emitter being oriented substantially co-planar with said rotor pole.

* * * * *

UNITED STATES PATENT AND TRADEMARK OFFICE
CERTIFICATE OF CORRECTION

PATENT NO. : 5,466,980
DATED : November 14, 1995
INVENTOR(S) : Potter

It is certified that error appears in the above-indentified patent and that said Letters Patent is hereby corrected as shown below:

Column 5, line 67, delete the word "pole" and replace it with --one or more rotor poles--

Signed and Sealed this

Twentieth Day of February, 1996

Attest:

BRUCE LEHMAN

Attesting Officer

Commissioner of Patents and Trademarks